United States Patent [11] 3,611,311

[72] Inventor Harold G. Andrews
Reading, Mass.
[21] Appl. No. 850,466
[22] Filed Aug. 15, 1969
[45] Patented Oct. 5, 1971
[73] Assignee Grason-Stadler Company, Inc.
West Concord, Mass.

[54] INTERFACE APPARATUS
14 Claims, 4 Drawing Figs.

[52] U.S. Cl. .......... 340/172.5
[51] Int. Cl. .......... G06f 9/18
[50] Field of Search .......... 340/172.5, 150; 235/157

[56] References Cited
UNITED STATES PATENTS

| | | | |
|---|---|---|---|
| 3,303,476 | 2/1967 | Moyer et al. | 340/172.5 |
| 3,378,820 | 4/1968 | Smith | 340/172.5 |
| 3,408,632 | 10/1968 | Hauck | 340/172.5 |
| 3,417,374 | 12/1968 | Pariser | 340/172.5 |

*Primary Examiner*—Gareth D. Shaw
*Attorney*—Kenway, Jenney & Hildreth

ABSTRACT: The interface apparatus disclosed herein facilitates the exchange of data between a digital computer and each of a plurality of experiment stations operating in real time by sequentially interrogating the stations to determine if a change of state has occurred, the idle program of the computer being interrupted only when a station of changed state is encountered. Each station includes not only stimulus and response registers for affecting and registering the state of the station, but also a respective digital clock so that the computer proper is freed from any need to continuously monitor timing operations required by the stations. With regard to each station, the reaching of a predetermined count on the digital clock constitutes one form of change of state.

Harold G. Andrews,
INVENTOR

BY
Kenway, Jenney & Hildreth,
ATTORNEYS

Harold G. Andrews,
INVENTOR

BY
Kenway, Jenney & Hildreth,
ATTORNEYS

Harold G. Andrews, INVENTOR

BY
Kenway, Jenney & Hildreth,
ATTORNEYS

INTERFACE APPARATUS

BACKGROUND OF THE INVENTION

This invention relates to interface apparatus for use with a digital computer and more particularly to such apparatus which will facilitate the exchange of data between a digital computer and a plurality of experiment stations.

In experimental behavioral studies, the accumulation, recording and reduction of data relating to various experiments has typically been a time consuming and expensive task. While the reduction of data has often been accomplished with the aid of digital computers, e.g. for calculating correlation coefficients and the like, the translation of data to a form useable by the computer has frequently been done manually. While it has been known that a general-purpose computer of sufficient size, flexibility and memory capacity could be programmed to simultaneously conduct a plurality of behavioral science experiments and to collect and reduce the acquired data, the cost of a computer of such size and capacity has typically been prohibitive in the field of behavioral sciences.

The present invention is based in part upon an understanding that the requirement of a large, sophisticated digital computer has, in the past, been predicted upon the need for elaborate and detailed programming to provide the scanning, priority rating, and timing functions necessary for the running of a substantial number of experiments simultaneously, that is, in so-called real time.

Among the several objects of the present invention may be noted the provision of interface apparatus which permits a relatively small digital computer to simultaneously conduct a plurality of experiments; the provision of such apparatus which facilitates the exchange of data between a computer and a plurality of experiment stations; the provision of such apparatus which relieves the computer of the need to continuously scan the different experiment stations; the provision of such apparatus which relieves the digital computer of the need to perform timing operations for each of the several stations; the provision of such apparatus which provides for equal priority among the several experiment stations; and the provision of such apparatus which is relatively simple and inexpensive.

Other objects and features will be in part apparent and in part pointed out hereinafter.

SUMMARY OF THE INVENTION

Briefly, interface apparatus according to this invention is adapted for use with a relatively small digital computer. The apparatus facilitates exchange of data between the computer and a plurality of interface stations. Each of the interface stations includes a digital clock, a stimulus register the setting of which affects the state of the respective station, and a response register which is set in response to changes in the state of the respective station. Each station also includes gate means, operative when enabled, for selectively permitting data exchange between the computer and the clock and registers of the respective station. The apparatus further includes a multiplexer which cyclically scans the stations in a predetermined sequence to determine if a change of state in any station has occurred. Upon encountering a station of changed state, the multiplexer enables the gate means of that station. In a preferred aspect of the invention the multiplexer continues the scanning cycle from the point of interruption following completion of the data exchange with the interrupting station.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
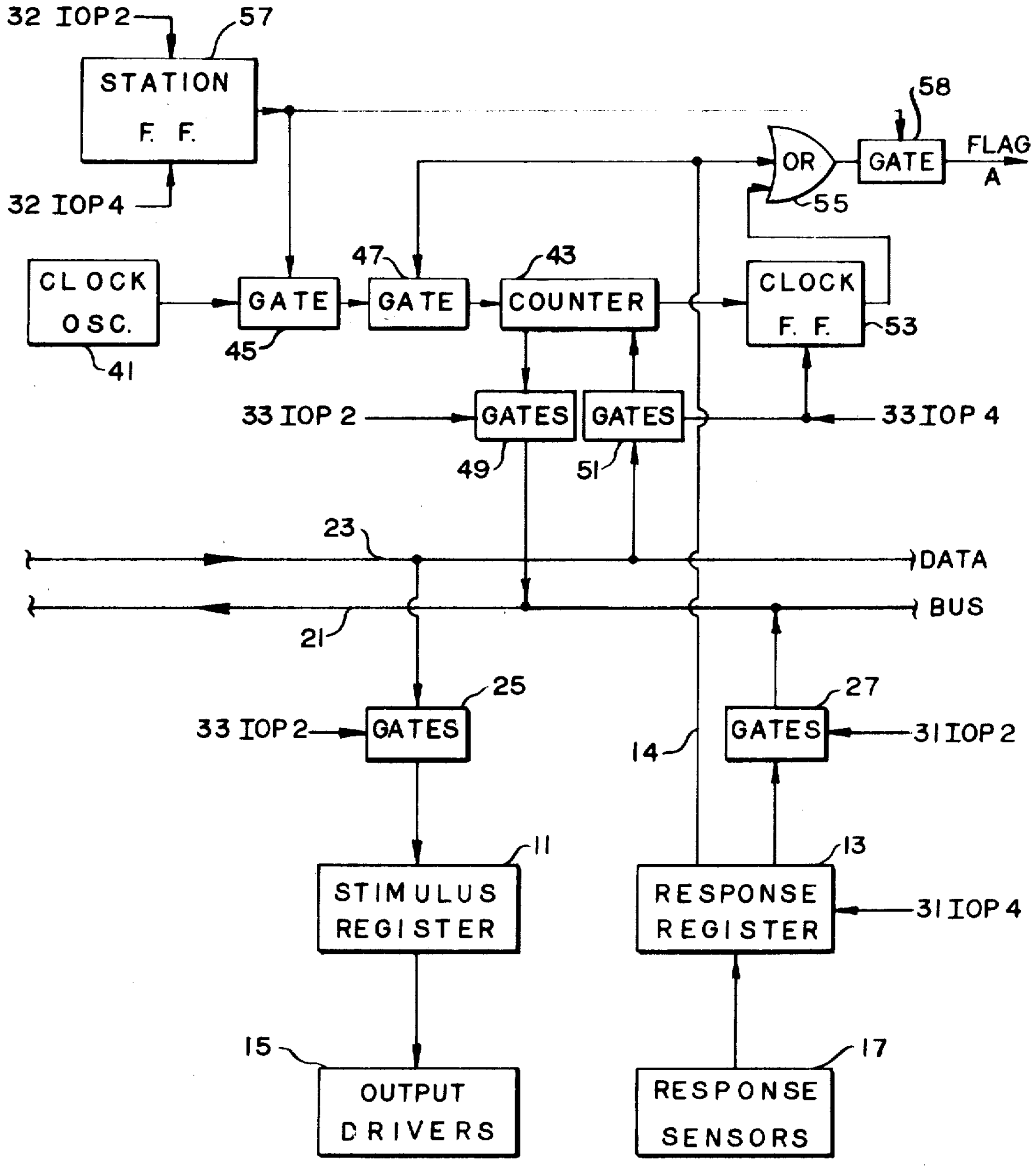
FIG. 1 is a block diagram of timing, stimulus and response data circuitry employed in a representative one of the plurality of interface stations comprising one embodiment of apparatus according to the present invention.

Referring now to FIG. 1, the apparatus illustrated there employs a stimulus register 11 and a response register 13. As is understood by those skilled in the behavioral sciences, a great many experiments, control processes, and teaching procedures can be defined in terms of stimuli which may affect the state of the experiment, e.g. by providing so-called reinforcement in behavioral experiments, and responses which represent changes in the state of the experiment, e.g. due either to the applied stimuli or the characteristics of the subject of the experiment. The stimulus register 11 comprises a plurality of bistable or flip-flop circuits which remain in a given state once set and operates to control suitable output drivers 15. The drivers 15 provide output signals at appropriate power levels for generating the stimuli desired in the particular experiment in response to the binary or logic level signals provided by the register itself.

The response register 13, which also comprises a plurality of flip-flops or other memory elements, is set by response sensors, indicated at 17, which register various events which constitute changes in the state of the respective experiment. A simple example of such a sensor is a push button which is operated by the subject of the experiment and which causes a respective flip-flop circuit in the register 13 to be set.

The stimulus register 11 and the response register 13 are selectively connected to or placed in communication with data lines or buses 21 and 23 through respective gate circuits 25 and 27. As will be apparent hereinafter, the data buses extend to all the stations and to the multiplexer of FIG. 3 from the computer itself and the selection of which of these systems is to be coupled to the computer is controlled by a device selection code generated by the computer.

As noted previously, the present apparatus permits or facilitates the use of a relatively small or inexpensive digital computer for simultaneously conducting a plurality of generalized experiments. The apparatus illustrated by way of example has been arranged specifically for use with the PDP-8/I computer manufactured by the Digital Equipment Corporation of Maynard, Massachusetts. Accordingly, various steps in the operation of the present apparatus are described as being under the control of signals, e.g. input-output pulses, which are generated by that computer. As is understood by those skilled in the art and familiar with this widely sold computer, such input-output control signals are generated by the computer in its normal or known operation in communicating with peripheral equipment generally, e.g. teletypes and tape or card punches and readers, as well as with the present apparatus. For further information regarding the characteristics and requirements generally for equipment interfacing with this computer, reference should be made to the various handbooks published by the Digital Equipment Corporation relating specifically to the PDP-8/I computer.

In the illustrative embodiment described herein, data exchanges between each experiment station and the digital computer are assumed to be in parallel form. Thus, although the various data buses such as 21 and 23 are represented by single lines in the drawings, it should be understood that in actual practice a plurality of lines or wires may be provided which connect each bit of a given register with a respective element in the computer. Likewise, the data gating circuits such as those indicated at 25 and 27 should be understood to be of a multielement type appropriate for accommodating parallel transfers of binary data. In the PDP-8/I the data buses (21 and 23) communicate with a register which is designated as the accumulator and which is employed in certain arithmetic as well as input-output functions.

As suggested previously, exchanges of data between a station and the computer are initiated in response to a change of state at the stations. For this purpose, the register 13 provides a signal, on a line designated 14, when any bit in the register is triggered by the respective response sensor. As is understood, such a signal may be generated by combining the various parallel bits of data in an OR gate (not shown).

Again referring to FIG. 1, each station also comprises a digital clock. As illustrated, each clock comprises a clock oscillator 41 which selectively drives a counter 43 through a pair of gates 45 an 47. Either of these gates can operate to block the clock pulses and thereby effectively stop the clock. The clock counter 43, which is one sense can be understood to be a register containing information about the state of the station, is also selectively coupled to the data buses 21 and 23 which connect the various experiment stations to the computer, through gating circuits 49 and 51. The clock counter 43 can be read into the computer bus 21 through gating circuits 49 and can be preset to a desired number from data provided by the computer at bus 23 through gates 51.

The gate 45 is controlled by a station flip-flop 57. As will be apparent, this flip-flop effectively comprises the on-off switch for the station, the state of this flip-flop being selectively set by input-output control signals which are generated by the computer as explained hereinafter. The gate 47 is controlled by the change of state signal provided by the response register 13 over lead 14. Thus, upon any change of state due to the actuation of a response sensor, the digital clock is stopped thereby providing an indication of the time at which the event occurred.

When the clock counter 43 reaches a predetermined number, e.g. all binary zeros, it triggers a clock flip-flop circuit 53. As is understood by those skilled in the art, the triggering signal for the flip-flop 53 may in fact be the carry signal from the last, i.e. most significant, stage of the counter 43. The reaching of this predetermined count by the clock counter 43 is taken as a change of state in the station in a manner essentially the same as a change of state as registered by one of the response sensors 17. The flip-flop 53 may in fact comprise a bit of the response register 13 in which case a signal will be provided at lead 14 if the counter 43 overflows just as in the case of any other change of state. As illustrated with a separate flip-flop, an output signal from the clock flag flip-flop 53 is combined in an OR gate 55 with the signal from the response register 13 to provide a change of state signal. The station flip-flop 57 operates a gate 58 which controls the passage of this change-of-state signal, the gated signal being provided to the multiplexer as a flag signal, i.e. FLAG A. The flag signal indicates to the multiplexer of FIG. 3 that the respective station has undergone a change in state.

Figure 2:
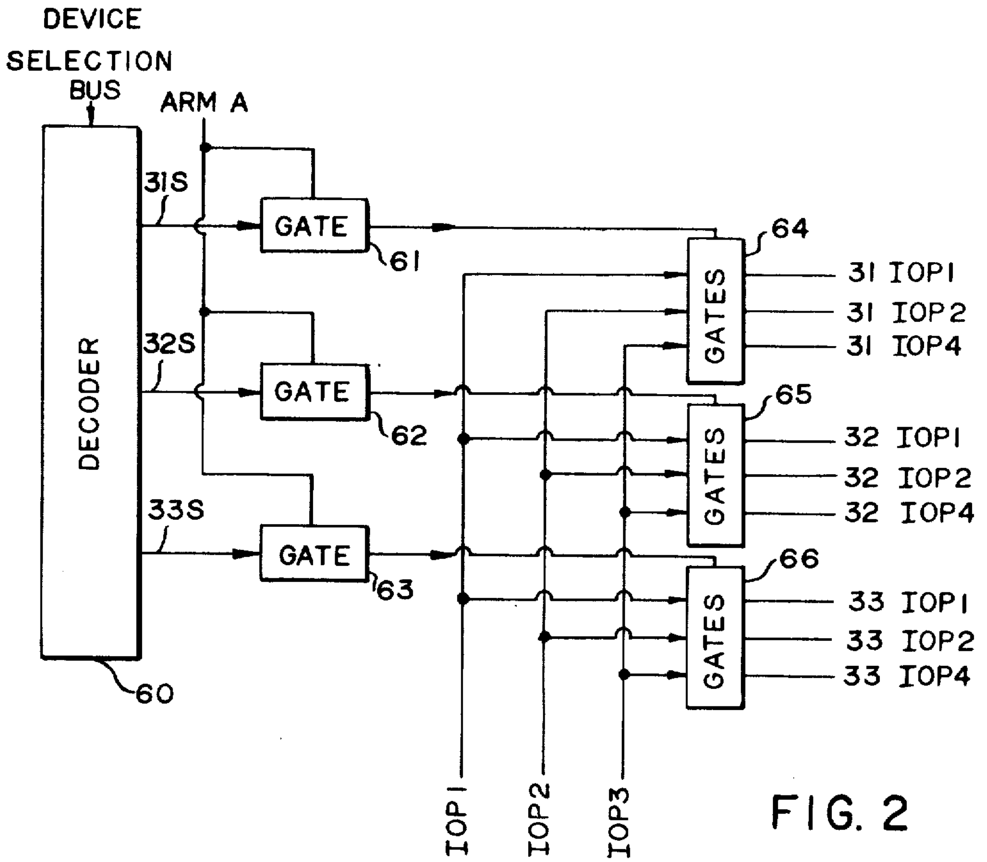
FIG. 2 is a block diagram of device-selection gating circuitry associated with a representative one of the interface stations.

As may be seen from FIG. 1, various operations in the station data circuitry are controlled by various IOP (input-output pulse) signals as indicated on the drawing. These IOP signals are derived for each station by device selector circuitry as illustrated in FIG. 2. As is known in the art, the PDP-8/I computer referred to previously generates a sequential series of input-output pulses IOP1, IOP2 and IOP4 in various combinations in response to program instructions relating to the exchange of data between the computer proper and various peripheral or interface devices. The computer also provides, over a device selection bus, signals designating the peripheral device with which the computer intends to exchange data, the actual exchange of data being controlled by the IOP pulses. In accordance with one aspect of the present invention, the computer is relieved of the necessity of individually addressing or selecting each of the registers or counters associated with the several experiment stations. Rather, the computer employs only four device selection designations or codes in communicating with any of the registers of the present apparatus. One of the four codes designates or selects the multiplexer. Each of the remaining three codes is employed to designate a respective function or type of station register or counter, i.e. the clock counter 43, the stimulus register 11 or the response register 13, there being one register or counter of each type in each of the several experiment stations.

With reference to FIG. 2, each experiment station includes a decoder 60 which, in response to proper combinations of signals on the device selection bus, produces respective control signals, 31S, 32S, 33S, each of which designates a respective type of register or counter. As is described in greater detail hereinafter, the multiplexer circuitry generates various ARM signals which select which of the several stations is to be in communication with the computer. In FIG. 2 which is assumed to be the device selection circuitry associated with the A station of FIG. 1, the ARM A signal is applied to three gate circuits 61, 62 and 63 which selectively pass the respective register control signals 31S, 32S and 33S for that station. As is understood by those skilled in the art, the decoding and gating functions which are indicated separately in FIG. 2 may in fact be combined in a single stage of gate circuits.

A respective set of gating circuits (64, 65 and 66) is provided for each type of register, for selectively passing the IOP signals in response to the respective gated register selection signal. The IOP signals which have been conditioned by the appearance of the proper of the respective device selection codes and the respective ARM signals are designated with respective prefixes, e.g. 31, 32 and 33. Again with reference to the PDP-8/I computer, the device code designations 31, 32 and 33 are among those available for peripheral devices. As is pointed out hereinafter, the device code 30 is employed for the multiplexer.

Figure 3:
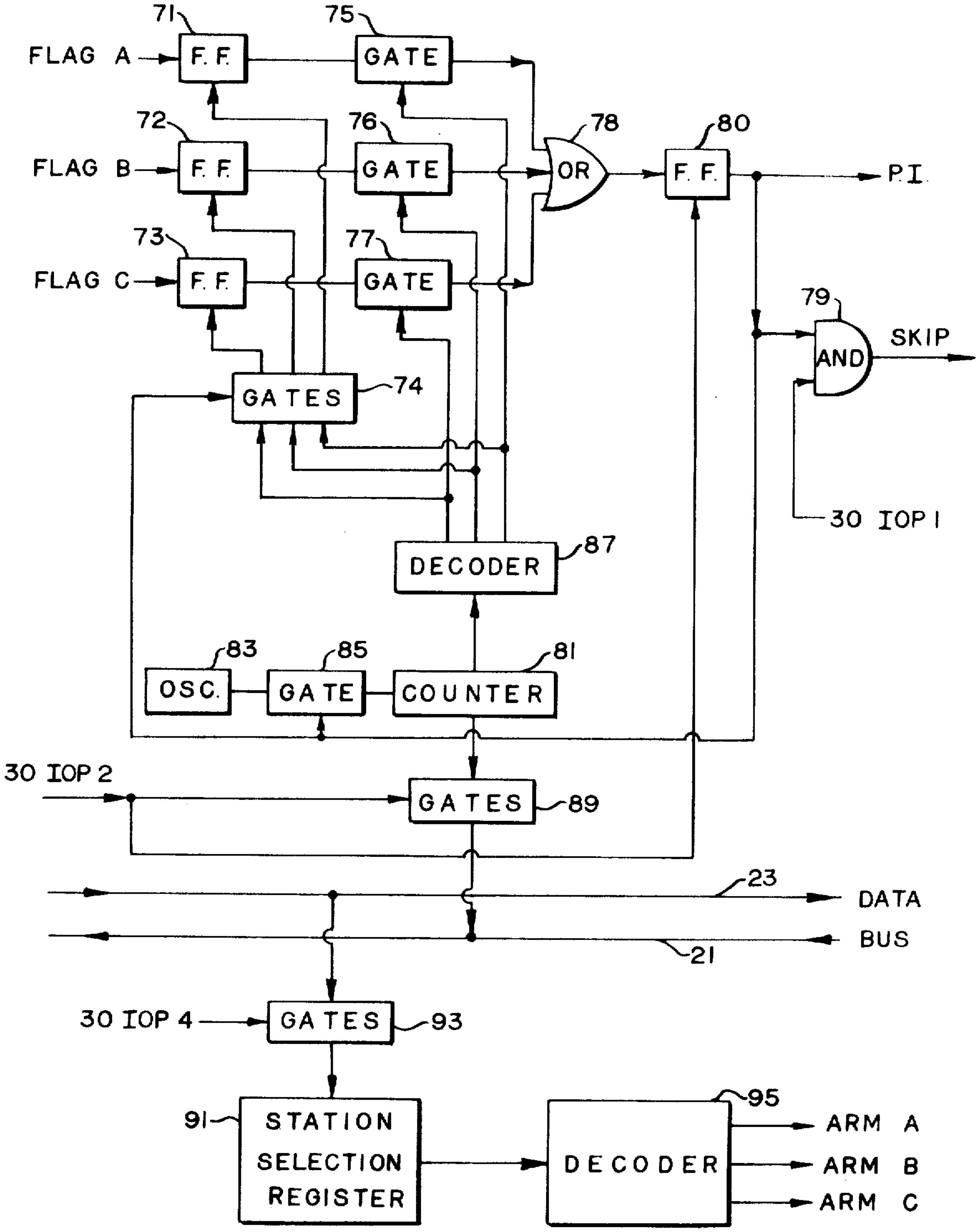
FIG. 3 is a block diagram of multiplexer circuitry employed in the present apparatus for scanning a plurality of stations such as illustrated in FIGS. 1 and 2.

With reference to FIG. 3 and the multiplexer illustrated there, the flag signals which are generated by changes of state in the various stations (FLAG A, FLAG B, etc.) are applied to respective flip-flop circuits 71–73 to indicate to the multiplexer when a change in state has occurred in one of the stations. Output signals from the flip-flops are applied, through respective gate circuits 75–77 and an OR gate 78 to a program interrupt flip-flop 80. Thus, if any one of the flip-flops 71–73 is set, it can trigger the program interrupt flip-flop 80 when the respective gate 75–77 is opened. The output signal from flip-flop 80 is provided to the computer as a program interrupt (P.I.) signal. The flip-flop output signal is also applied to one input of an AND gate 79, an IOP signal being applied to the other input.

The output signal from the AND gate is provided to the computer as a SKIP signal as described hereinafter. The flip-flops corresponding to the various stations are scanned sequentially by a commutator which comprises a binary counter 81; an oscillator 83 which drives the counter through a gate 85; and a decoder 87 which converts the binary number held by the counter to a one-out-of-N format appropriate for interrogating the station flip-flops one at a time, the output signals from the decoder being applied to the gates 75–77 for opening the gates one at a time. As is understood, each gate 75–77 will thus be opened when the number held in the counter 81 corresponds to the respective station. The output signals from the decoder 87 are also applied to the reset terminals of the flip-flops 71–73 through a set of gates 74 so that the flip-flop corresponding to the number in the counter 81 will be reset when the gates 74 are opened.

The number held in counter 81 may also be selectively applied to the computer data bus 21 by means of gating circuitry 89. As is described hereinafter, this data transfer enables the computer to identify a particular station which has initiated a program interrupt.

Data which represents a particular station may also be read into a station selection register 91 by means of gating circuitry 93 under the control of an appropriate IOP signal. This data representing a particular station may be either the identification of a station initiating a program interrupt and read into the computer accumulator just previously from counter 81 or it may be the identification of a station which the computer needs to interrogate under the control of a program instruction. The binary coded station identification held in the station selection register 91 is applied to a decoder 95 which provides signals in a one-out-of-N format suitable for energizing or enabling an individual one of the stations. These latter signals are designated as ARM signals as mentioned previously, e.g. ARM A, ARM B, etc.

Figure 4:
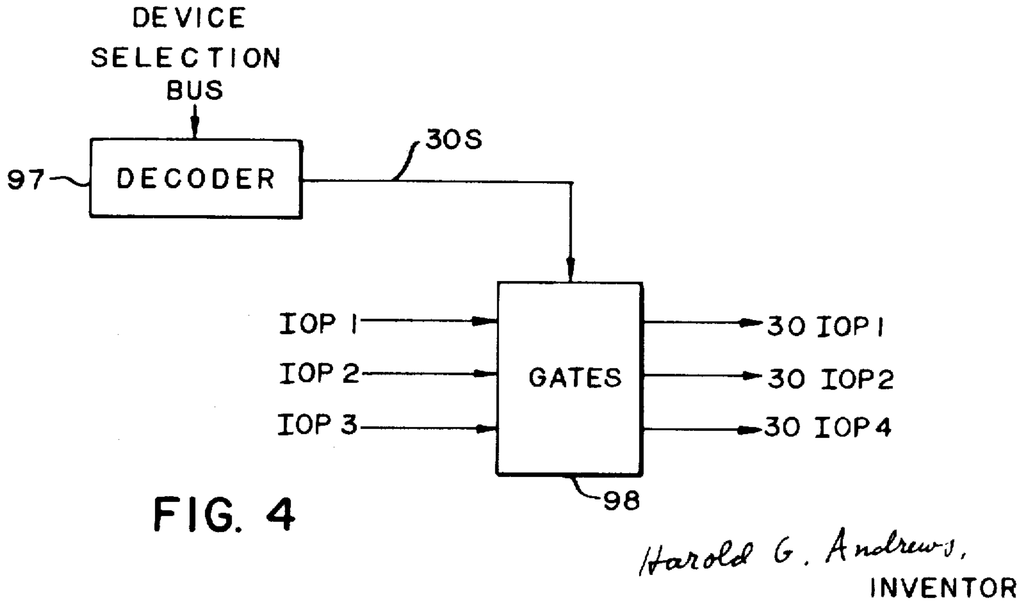
FIG. 4 is a block diagram of device-selection circuitry associated with the multiplexer of FIG. 3.

As was noted previously, the device code 30 is employed for designating the multiplexer generally. As with the individual stations, the multiplexer is provided with a decoder 97 (FIG. 4)which, in response to the respective device code on the device selection bus from the computer, generates a respective signal (30S) for energizing or enabling gating circuitry 98 which selectively allows the IOP pulses available from the computer to be applied to various parts of the multiplexer control circuitry, the various input pulses so conditioned being prefixed by the number 30.

OPERATION

Preferably, the computer with which the present peripheral apparatus is employed is programmed to operate on a time-sharing basis with the experiments being conducted at the various interface stations being interleaved with the processing of a so-called idle program, the idle program being related to problems or procedures which do not have to be dealt with on a real time basis as do the experiments in process. In a particular application of the present apparatus in the field of behavioral science experiments, the computer is programmed to perform data reduction tasks and report preparation between tasks associated with the actual running of the different experiments and the accumulation of data therefrom.

Assuming that the various experiments are under way and that all recent changes in state have been completely dealt with by the computer so that the idle program is being run, the operation of the present interface apparatus is substantially as follows. If a response sensor in a particular experiment is tripped setting the respective response register 13, a respective FLAG signal is generated, it being assumed that the respective station is operating so that the station flip-flop 57 is set and the gate 45 open. In the multiplexer the flag signal sets the respective one of the flip-flops 71–73. As noted previously, the gates 75–77 are sequentially opened under the control of the commutating circuitry comprising counter 81, oscillator 83 and decoder 87. Thus, when the gate connected to the tripped flag flip-flop is opened, a signal will be passed by the OR gate 78 and will trigger the program interrupt flip-flop 80, thereby applying a program interrupt (P.I.) signal to the computer. The generation of the program interrupt signal also closes the gate 85 so that the counter 81 is stopped while it still contains the number which corresponds to or identifies the station whose FLAG signal initiated the generation of the program interrupt signal.

Upon receipt of the program interrupt signal, the PDP-8/I computer itself scans its peripheral devices to determine which device initiated the program interrupt. Since the experiments typically associated with the present apparatus will typically require that their needs be processed on a real time basis, the programming of the computer is preferably such that the present apparatus is given priority with respect to the other peripheral devices such as teletypes, tape readers and the like. Thus, as soon as the computer has completed the instruction actually in process at the time when the program interrupt signal was received, the computer interrogates the present apparatus by generating the multiplexer device selection code (30) and by providing an IOP1 pulse. As may be seen from FIG. 3, this interrogation generates a skip signal which informs the computer that it was the present interface apparatus which initiated the program interrupt signal. The SKIP signal causes the computer to skip in its program of instructions to a point appropriate for dealing with the experiments which are being controlled through the present interface apparatus. The computer program at this point will typically cause the generation of an IOP2 pulse which, being addressed to the multiplexer and thus causing the generation of the 30 IOP2 signal, causes the contents of counter 81 to be read through the gates 89 into the computer accumulator data bus 21. The computer thus receives the identification of the particular station which caused the interruption of the scanning procedure and the program interrupt signal.

The same IOP signal is also applied to reset terminal of the program interrupt flip-flop 80. The resetting of flip-flop 80 opens the gates 74. Since the counter 81 is stopped on the number corresponding to the station whose flag signal initiated the generation of the program interrupt signal, only the decoder output line corresponding to that station will be active. Thus, only that flip-flop (71–73) which corresponds to the station initiating the interruption will be reset. The resetting of flip-flop 80 also opens the gate 85 so that the counter 81 will again be advanced by the oscillator 83. It can thus be seen that the scanning of the individual stations continues from the point of interruption rather than being preset to some arbitrary starting point. Accordingly, if station C experiences a change in state during a period while stations A or B are being dealt with by the computer, this station also is insured of receiving attention from the computer. In other words, the stations have equal priority access to the computer and repeated interruptions caused by one of the stations cannot prevent any of the other stations from receiving at least initial attention from the computer as needed.

Assuming that the program at this point requires the information as to what changes in state have occurred at the particular station, the program causes the generation of an IOP4 pulse which opens the gates 93 to admit the station identification code from the accumulator data bus 23 into the station selection register 91. Once the respective station identification code is stored in register 91, the multiplexer decoder 95 generated the ARM signal corresponding to that station. As noted previously, each ARM signal enables gates (64–66) associated with the respective station so that subsequent IOP signals associated with device selection codes corresponding to the different types of registers in the stations are passed only to the station identified by the number held in the multiplexer station selection register 91.

Having thus enabled or "armed" the respective station, the computer program will then typically generate the response register device selection code (31) together with an IOP2 pulse so that the 31 IOP2 signal is generated and the contents of the respective response register 13 are applied to the accumulator data input line 23. The program will then typically reset the response register by the generation of an IOP4 pulse.

If the time at which the program interruption occurred (as registered on the local digital clock) is of concern in the particular experiment, the computer program can obtain this information by generating the respective device selection code (33) and the IOP2 signal to cause the gate 49 to apply the contents of the clock counter 43 to the accumulator data input line 21. Thus, the computer can obtain the data necessary to fully assess the state of the particular experiment. With this information, the computer can, under the control of its stored program, determine whether any change in the applied stimuli should be provided. If so, the program causes the generation of the device selector code corresponding to the stimulus type of register (32) and generates an IOP2 signal. The 32 IOP2 signal is thus generated (FIG. 2) and this signal opens the gates 25 (FIG. 1) allowing information determining the new state of the stimuli to be entered into the stimulus register 11 from the accumulator output line 23. The 32 IOP2 signal is also applied to the station flip-flop 57 so that this flip-flop is placed in its on state, if it were not already in the on condition. It can thus be seen that entering data into the stimuli register can be employed to turn on a particular station. Conversely, if is is desired for any reason to shut off or terminate a given experiment, the device code 32 is generated along with an IOP4 pulse while the particular station identification is stored in the multiplexer station selection register 91 (FIG. 3). This signal then reverses the state of the station flip-flop 57, stopping its digital clock by closing the gate 45 and preventing the generation of a flag signal by closing the gate 58.

While only a single stimulus register has been shown for each station, it should be understood that a plurality of registers may be used if the stimuli to be applied are complex or must be of variable value. If multiple registers are used, addressing of a particular register can be accomplished by utilizing some of the bits of the data word being entered so that no additional device selection codes are required. In other words, only one device selection codes are required. In other words, only one device selection code is needed for each function (stimulus, response, etc.) or type of register even though several registers may be in fact utilized to accommodate the quantity of information required for a single function.

In addition to setting the stimulus parameters or conditions, the program can also set certain timing conditions on the experiment by presetting the counter 43. Presetting of the counter 43 is accomplished by generating the clock device selection code (33) and providing an IOP4 pulse so that the gates 51 are opened thereby setting a value from the computer accumulator into the counter. As noted previously, the clock flag flip-flop 53 is triggered when the counter reaches a predetermined number, e.g. all binary zeros, and thus a predetermined interval can be provided by setting the counter to a number which precedes the predetermined number by the desired increment. The IOP4 signal also resets the clock flag flip-flop 53 upon presetting of the counter.

Although the digital clock associated with each experiment station is in effect stopped by a change in state initiated by one of the response sensors 17, the time required before the computer responds and clears the flag is typically quite short in relation to the timing intervals provided by the clock oscillator 41. In actual practice it has been found that a clock timing increment of 10 milliseconds is entirely satisfactory for most behavioral science experiments. The computer can be expected to respond and clear a given flag signal in much less than that amount of time. Using this time increment a counter 43 may be provided in reasonable size to accumulate up to 40 seconds.

Since each of the stations is provided with a respective clock and various timing conditions can be imposed upon the experiment by presetting the clock, it can be seen that the computer is relieved of any necessity of providing timing operations for the experiment. In other words, the computer does not have to cyclically compare the contents of an internal clock register with various limits corresponding to the different experiments to determine whether given actions called for by the program may be necessary. Rather, each station or experiment proceeds independently until a change of state at the station itself initiates a program interrupt which, through the multiplexer, causes the computer to assess the condition of the station initiating the program interruption and to make appropriate changes in the corresponding stimuli pattern and timing conditions, all under the control of an appropriate stored program within the computer.

In addition, since the station selection register 91 permits enabling of only those data transfer gates associated with the station which initiated a particular interruption of the multiplexer scanning cycle, the computer can exchange data with the stimulus and response registers or the clock counter of the initiating station by addressing (through the use of the device selection code) only the type of register or counter with which it desires to exchange data. In other words, the computer does not have to provide a discrete device selection code for each individual register in all of the various experiment stations.

Once the computer has dealt with a given program interruption, e.g. by acquiring the identification of the station which initiated the interruption, and by acquiring the data which represents the state of that station, it is not necessary that the computer immediately deal with that station, e.g. by altering the stimulus pattern or the timing conditions. If desired, the program can determine the priority of the need for response in relation to other demands which may be placed on the computer's capacity. Thus, the computer can complete some more necessary task before returning to a station which has previously caused a program interrupt due to a change in state and can then at that later time make appropriate changes in the stimuli or timing conditions governing that experiment. As is understood by those skilled in the art, the time required for the higher priority operation may be quite small, e.g. in the order of a millisecond or less, in relation to the time intervals which are of significance in a given behavioral science experiment. Thus, the computer programmer is provided with great flexibility.

As noted previously, many types of real-time processes can be defined in terms of stimuli and responses. Thus, apparatus constructed in accordance with the present invention may be readily adapted for use in various fields, e.g. in industrial process control applications where a plurality of parameters are to be controlled, and the claims should be correspondingly construed.

While the embodiment illustrated employs a single stage of multiplexing to permit a computer to deal with a plurality of experiments, it will be seen that successive stages of multiplexing may be employed to identify various registers within a station or experiment. When arranged along the lines of the multiplexing system illustrated, such as successive multiplexing system will retain the advantages of the present system, i.e. the ability to deal with a variety of experiments using a minimum number of device selection codes and the affording of equal priority to all of the experiments while immediately identifying to the computer the experiment and/or register requiring attention.

In view of the foregoing, it may be seen that several objects of the present invention are achieved and other advantageous results have been attained.

As various changes could be made in the above apparatus without departing from the scope of the invention, it should be understood that all matter contained in the above description or shown in the accompanying drawings shall be interpreted as illustrative and not in a limiting sense.

What is claimed is:

1. Interface apparatus for use with a computer, said apparatus comprising:
   - a plurality of interface stations each of which includes;
     - a digital clock for registering the passage of time at the respective station,
     - a stimulus register, the setting of which affects the environmental state of the respective station,
     - a response register which is set in response to changes in the state of the respective station originating at the station environment, the state of the respective station being defined by the data held in said stimulus and response registers, and
     - gate means operative when enabled for selectively permitting data exchange between the computer and the clock and registers of the respective station, and
   - a multiplexer associated with said stations for cyclically scanning said stations in a predetermined sequence to determine if a change in state in any station has occurred and, upon encountering a station of changed state, enabling the gate means of that station.

2. Apparatus as set forth in claim 1 wherein said multiplexer includes means for interrupting the scanning upon encountering a station of changed state and continuing the scanning from the point of interruption after an exchange of data between the computer and the station initiating the interruption.

3. Apparatus as set forth in claim 1 wherein said digital clock includes means operating in cooperation with said response register for registering a change of state when the clock reaches a predetermined setting.

4. Apparatus as set forth in claim 3 wherein said gate means are interconnected with said clock for permitting the clock to be set in response to data provided by said computer.

5. Apparatus as set forth in claim 1 wherein each station includes means responsive to the data held in said response register for providing a flag signal when a change of state has occurred and wherein said multiplexer includes a respective gate for each station for selectively generating a program interrupt signal in response to the respective flag signal which is provided to the computer and includes also means for operating the respective station gates in sequence.

6. Apparatus as set forth in claim 5 wherein said means for operating the respective gates in sequence is a commutator which includes a timing pulse generator, a counter driven by said pulse generator and a decoder for operating each gate individually in response to the presence of a respective number in said counter.

7. Apparatus as set forth in claim 6 wherein said pulse generator is an oscillator.

8. Apparatus as set forth in claim 6 wherein said commutator further comprises a gate interposed between said generator and said counter and means for opening said gate to stop the incrementing of the number in said counter in response to the generation of said program interrupt signal.

9. Apparatus as set forth in claim 1 wherein said multiplexer includes a station identification register and means for setting said station identification register in response to data provided by said computer and further includes means for generating a signal permitting the enabling of the gate means of a selected station in response to the presence of a respective number in said register.

10. Interface apparatus for use with a computer, said apparatus comprising:
- a plurality of interface stations each of which includes;
  - a digital clock for registering the passage of time at the respective station,
  - a stimulus register, the setting of which affects the environmental state of the respective station,
  - a response register which is set in response to changes in the state of the respective station originating at the station environment, the state of the respective station being determined by the data held in said stimulus and response registers,
  - gate means operative when enabled for selectively permitting data exchange between the computer and the clock and registers of the respective station,
- a multiplexer associated with said stations and apart from said computer for cyclically scanning said stations in a predetermined sequence to determine if a change in state in any station has occurred, said multiplexer including;
  - means for initiating an interruption of the scanning cycle when a station of changed state is encountered,
  - means for providing data signals to the computer identifying the interruption initiating station, and
  - means for enabling the gate means of the initiating station during an interruption whereby the computer can exchange data with the registers and clock of the initiating station.

11. Interface apparatus for use with a computer, said apparatus comprising:
- a plurality of interface stations each of which includes;
  - a timing register,
  - means for incrementing the count held by said timing register at predetermined intervals thereby to register the passage of time at the respective station,
  - first gate means operative when enabled for selectively presetting said timing register in response to signals provided by the computer,
  - second gate means operative when enabled for selectively applying signals representing the count held by said timing register to the data input of the computer,
  - a stimulus register,
  - third gate means operative when enabled for selectively setting said stimulus register in response to signals provided by the computer,
  - a response register which is set in response to changes in the state of the respective station originating at the station environment, the state of the respective station being determined by the data held in said stimulus and response registers,
  - fourth gate means operative when enabled for selectively applying signals representing the state of said response register to the data input of the computer,
  - means for selectively providing a flag signal,
  - means for initiating said flag signal when said timing register reaches a predetermined count, and
  - means for initiating said flag signal in response to a change in the data held in said response register, and
- a multiplexer associated with said stations for cyclically scanning said stations in a predetermined sequence, said multiplexer including:
  - means for initiating an interruption of the scanning cycle when a station providing a flag signal is encountered,
  - means for providing data signals to the computer identifying the interruption initiating station, and
  - means for enabling the gates of the initiating station whereby the computer can exchange data with registers in the initiating station.

12. An experiment interface station for use with a computer, said station comprising:
- a timing register;
- means for incrementing the count held by said timing register at predetermined intervals thereby to register the passage of time at the respective station;
- first gate means for selectively presetting said timing register in response to signals provided by the computer;
- second gate means for selectively applying signals representing the count held by said timing register to the data input of the computer;
- a stimulus register;
- third gate means for selectively setting said stimulus register in response to signals provided by the computer;
- a response register which is set in response to changes in the state of the respective station originating in the station environment, the state of the respective station being determined by the data held in said stimulus and response registers;
- fourth gate means for selectively applying signals representing the state of said response register to the data input of the computer;
- means for selectively providing a flag signal;
- means for initiating said flag signal when said timing register reaches a predetermined count; and
- means for initiating said flag signal in response to a change in the state of said response register.

13. Interface apparatus for use with a computer, said apparatus comprising:
- a plurality of interface stations each of which includes;
  - a timing register,
  - means for incrementing the count held by said timing register at predetermined intervals thereby to register the passage of time at the respective station,
  - first gate means operative when enabled for selectively presetting said timing register in response to signals provided by the computer,
  - second gate means operative when enabled for selectively applying signals representing the count held by said timing register to the data input of the computer,
  - a stimulus register,
  - third gate means operative when enabled for selectively setting said stimulus register in response to signals provided by the computer,
  - a response register which is set in response to changes in the state of the respective station, the state of the station being determined by the data held in said stimulus and response registers,
  - fourth gate means operative when enabled for selectively applying signals representing the state of said response register to the data input of the computer, means for selectively providing a flag signal, means for initiating said flag signal when said timing register reaches a predetermined count, and means for initiating said flag signal in response to a change in the state of said response register, and a multiplexer associated with said plurality of stations for cyclically scanning said stations in a predetermined sequence, said multiplexer including;

a digital counter, means for periodically incrementing said counter, a respective gate for each station for selectively causing the respective flag signal to generate a program interrupt signal which is provided to the computer, a decoder for operating each of the respective gates when a respective number is present in said counter, means for interrupting the incrementing of said counter in response to a program interrupt signal, the number held in the counter being thereby representative of the station initiating the interruption, fifth gate means for selectively applying the number held in said counter to the data input of the computer, a station identification register, sixth gate means for selectively setting said station identification register in response to data provided by the computer, and means for enabling the first, second, third and fourth gate means associated with the station corresponding to the number held in said station identification register whereby a station experiencing a change of state is identified to the computer and the computer can exchange data with registers in that station.

14. Multiplexer apparatus for facilitating exchanges of data between a computer and each of several different types of registers in each of a plurality of interface stations, each station being operative to provide a flag signal when a change of state occurs at the station, said multiplexing apparatus comprising:

a counter;

a timing pulse generator for cyclically incrementing said counter;

switching means for selectively interrupting the incrementing of said counter and for providing a program interrupt signal to the computer;

a respective gate for each station for selectively causing the respective flag signal to operate said switching means thereby to provide a program interrupt signal to the computer;

a decoder for operating each gate in response to the presence of a respective number in said counter;

first gate means responsive to an interrogating pulse from said computer for applying the number held in said counter to the data input of the computer thereby to identify the initiating station to the computer;

a group of device selectors associated with each station, there being one selector for each station register, each selector being operative when enabled for selectively coupling the station register of the respective type with the data input of the computer in response to a device selection signal from the computer representing the respective register type;

a station identification register;

second gate means for selectively setting said station identification register in response to data provided by the computer; and means for enabling the device selectors associated with the station corresponding to the number held in said station identification register whereby a station experiencing a change of state is identified to the computer and the computer can exchange data with registers in that station.